(12) United States Patent
Lazaro, Jr. et al.

(10) Patent No.: US 9,263,840 B1
(45) Date of Patent: Feb. 16, 2016

(54) SELF-MONITORING ELECTRICAL CONTACT INSERTION TOOL

(71) Applicant: The Boeing Company, Seal Beach, CA (US)

(72) Inventors: Luis J. Lazaro, Jr., Shoreline, WA (US); Wesley M. Johnson, Snohomish, WA (US); Frederick Boyd McGalliard, III, Kent, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 13/847,853

(22) Filed: Mar. 20, 2013

(51) Int. Cl.
*H01R 43/22* (2006.01)

(52) U.S. Cl.
CPC ..................... *H01R 43/22* (2013.01)

(58) Field of Classification Search
CPC .................... H01R 43/20; H01R 43/22
See application file for complete search history.

(56) References Cited

U.S. PATENT DOCUMENTS

| | | | | | |
|---|---|---|---|---|---|
| 3,420,090 | A | * | 1/1969 | Saddoris et al. | 73/9 |
| 3,766,777 | A | * | 10/1973 | Roveti | 73/862.01 |
| 3,808,874 | A | * | 5/1974 | Trevithick | 73/9 |
| 3,922,600 | A | * | 11/1975 | Roveti | 324/508 |
| 2010/0264936 | A1 | * | 10/2010 | Tarone | 324/538 |

FOREIGN PATENT DOCUMENTS

EP    0848462 A2    6/1998

* cited by examiner

*Primary Examiner* — Carl Arbes
(74) *Attorney, Agent, or Firm* — Armstrong Teasdale LLP

(57) ABSTRACT

An electrical contact insertion tool includes a handle, an insertion tip assembly extending from the handle, a surface probe assembly extending from the handle, and an indicator. The insertion tip assembly is configured to apply a force to an electrical contact to accomplish insertion of the electrical contact into an electrical connector. The surface probe assembly is configured to determine a displacement associated with the insertion tip assembly. The indicator is configured to present an indication of positive electrical contact insertion based at least in part on the force and the displacement associated with the insertion tip assembly.

12 Claims, 4 Drawing Sheets

SELF-MONITORING ELECTRICAL CONTACT INSERTION TOOL

BACKGROUND

The present disclosure relates generally to hand tools and, more particularly, to a self-monitoring electrical contact insertion tool.

Known electrical contact insertion tools are configured to install electrical contacts (i.e., couple the electrical contact to an electrical connector). In use, an electrical wire is attached to an electrical contact prior to insertion of the electrical contact into the electrical connector. Improperly installed electrical contacts, also referred to as unseated contacts, may result in an open electrical circuit and thus generally lead to system errors. In an aircraft operation environment, such system errors may result in delaying a flight and/or grounding an aircraft. Identifying and reinstalling an unseated contact after manufacture may be time consuming and/or tedious. To reduce a number of improperly installed electrical contacts, at least some electrical contacts are "pull tested" during manufacture by pulling on the wire that has been attached to the electrical contact. Pull testing each electrical contact/wire combination, however, may be time-consuming and/or tedious.

BRIEF SUMMARY

In one aspect, a method is provided for inserting an electrical contact into an electrical connector. The method includes positioning the electrical contact with respect to an insertion tip assembly, positioning a distal end of a surface probe assembly adjacent a grommet of the electrical connector, advancing a handle towards an opening defined by the grommet of the electrical connector such that at least a distal end of the insertion tip assembly is positioned within the opening, and presenting an indication of positive electrical contact insertion based at least in part on a force associated with the insertion tip assembly and a displacement associated with the insertion tip assembly. The insertion tip assembly extends from the handle, and the surface probe assembly extends from the handle substantially parallel to the insertion tip assembly.

In another aspect, an electrical contact insertion tool is provided. The electrical contact insertion tool includes a handle, an insertion tip assembly extending from the handle, a surface probe assembly extending from the handle, and an indicator. The insertion tip assembly is configured to apply a force to an electrical contact to accomplish insertion of the electrical contact into an electrical connector. The surface probe assembly is configured to determine a displacement associated with the insertion tip assembly. The indicator is configured to present an indication of positive electrical contact insertion based at least in part on the force and the displacement associated with the insertion tip assembly.

In yet another aspect, an electrical contact insertion tool is provided. The electrical contact insertion tool includes a handle, an insertion tip assembly extending from the handle, and an indicator. The insertion tip assembly is configured to apply a force to an electrical contact to accomplish insertion of the electrical contact into an electrical connector. The indicator is configured to present an indication of positive electrical contact insertion based at least in part on the force associated with the insertion tip assembly and a displacement associated with the insertion tip assembly.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to hand tools and, more particularly, to an electrical contact insertion tool. In one embodiment, an electrical contact insertion tool is provided for ensuring a positive insertion of an electrical contact into an electrical connector member that is sometimes referred to herein as a grommet. The electrical contact insertion tool includes a handle, an insertion tip assembly extending from the handle, and a surface probe assembly also extending from the handle. In use, a distal end of the surface probe assembly is positioned adjacent an electrical connector grommet, and the handle is advanced towards an opening defined by the electrical connector grommet such that at least a distal end of the insertion tip assembly and an electrical contact associated therewith are positioned within the opening. Once the electrical contact is properly installed, an indication is presented based at least in part on a force associated with the insertion tip assembly and a displacement associated with the insertion tip assembly. For example, in at least one embodiment, an electrical contact is determined to be fully seated when the force applied via the insertion tip assembly and the displacement associated with the insertion tip assembly, as determined by a displacement of the surface probe assembly, each satisfies a respective predetermined threshold, and the indication is presented when the predetermined thresholds are satisfied to indicate that the electrical contact is fully seated.

The methods and systems described herein may be implemented using computer programming or engineering techniques including computer software, firmware, hardware or any combination or subset thereof, wherein the technical effects may include at least one of a) detecting a longitudinal force associated with an insertion tip assembly, b) detecting a position associated with a surface probe assembly, c) determining a force associated with the insertion tip assembly, d) determining whether the force satisfies a first predetermined threshold, e) determining a displacement associated with the insertion tip assembly, f) determining whether the displacement satisfies a second predetermined threshold, g) presenting an indication based at least in part on the force and the displacement.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
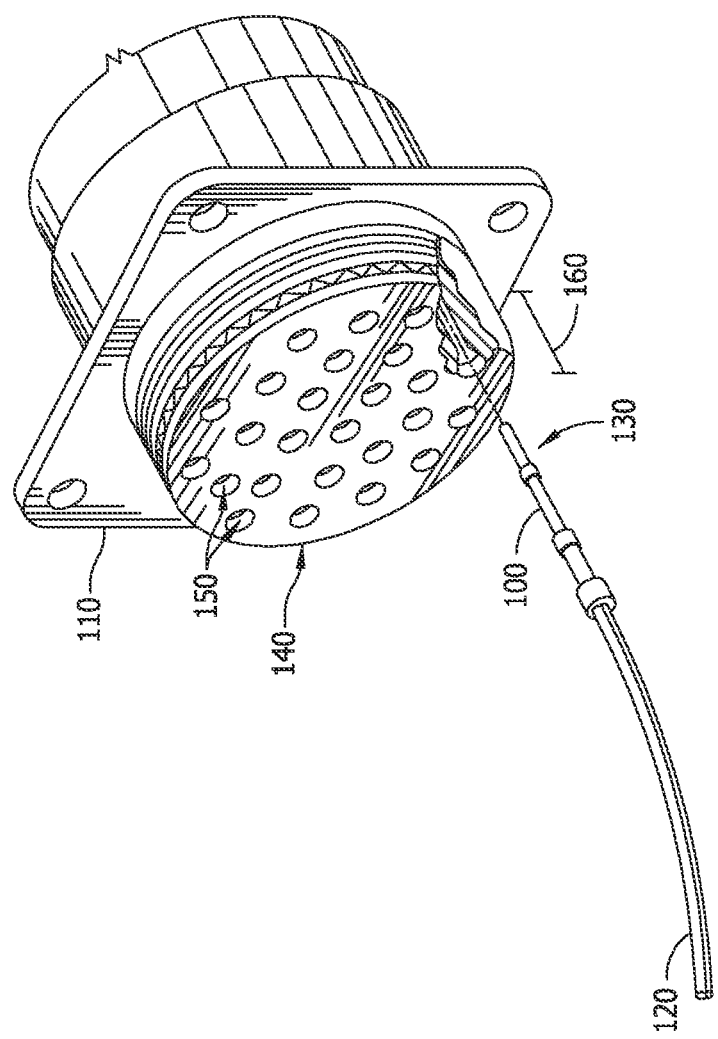
FIG. 1 is an isometric view of an exemplary electrical contact with a detailed sectionalized view and an exemplary electrical connector.

FIG. 1 shows an exemplary electrical contact 100 and an exemplary electrical connector 110. In the exemplary embodiment, electrical contact 100 is attached, electrically and mechanically, to a wire 120 and includes a tip 130 extending from wire 120. In the exemplary embodiment, electrical connector 110 includes a grommet 140 that defines at least one opening 150 each having a predetermined depth 160. In the exemplary embodiment, tip 130 and the remainder of contact 100 are sized and/or configured to be positioned at least partially within opening 150 and seated within grommet 140.

Figure 2:
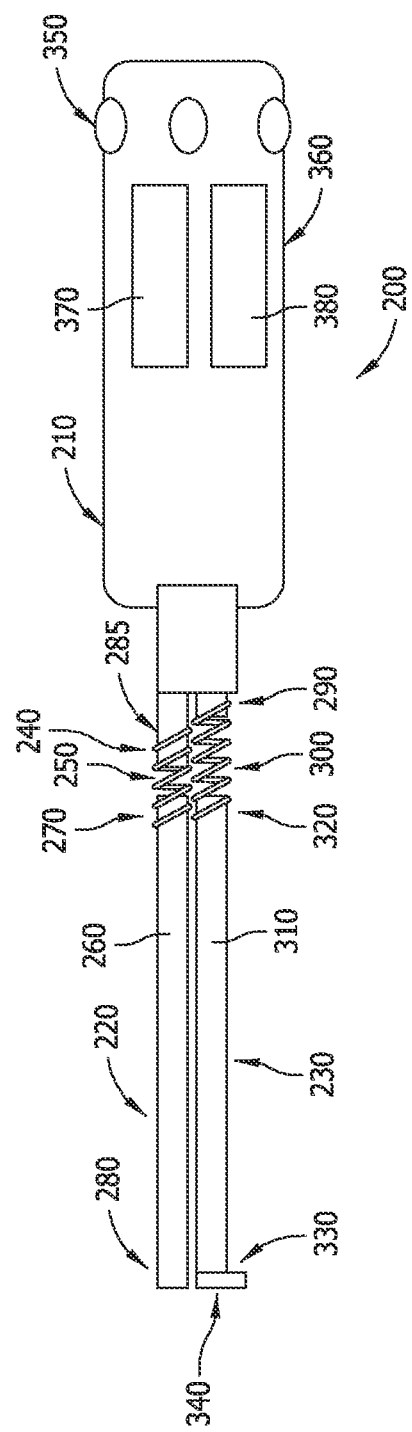
FIG. 2 is a schematic illustration of an electrical contact insertion tool that may be used to install the electrical contact into the electrical connector, both shown in FIG. 1.

FIG. 2 shows an electrical contact insertion tool 200 that may be used for positive insertion of electrical contact 100 into connector 110. In the exemplary embodiment, insertion tool 200 includes a handle 210, an insertion tip assembly 220 extending from handle 210, and a surface probe assembly 230 extending from handle 210. In the exemplary embodiment, insertion tip assembly 220 and surface probe assembly 230 are substantially parallel to each other and extend longitudinally from handle 210.

In the exemplary embodiment, insertion tool 200 includes an outer housing fabricated from a plastic material. Alternatively, the outer housing may be fabricated from any other material that enables insertion tool 200 to function as described herein. In the exemplary embodiment, the outer housing is sized, shaped, and/or configured to ergonomically interface with an operator. Alternatively, the outer housing may have any other size, shape, and/or configuration that enables insertion tool 200 to function as described herein.

In the exemplary embodiment, insertion tip assembly 220 includes a sensor 240, a biasing element 250 coupled to sensor 240, and a shaft 260 coupled to biasing element 250. More specifically, in the exemplary embodiment, shaft 260 includes a proximal end 270 coupled to biasing element 250 and a distal end 280 that is couplable to electrical contact 100 and/or wire 120 attached thereto.

In the exemplary embodiment, sensor 240 enables a force associated with insertion tip assembly 220 to be determined. More specifically, in the exemplary embodiment, insertion tip assembly 220 is movable between a resting configuration (i.e., a position wherein the longitudinal force associated with insertion tip assembly 220 is zero) and a strained configuration (i.e., a position wherein the longitudinal force associated with insertion tip assembly 220 is not zero), and sensor 240 detects the longitudinal force associated with insertion tip assembly 220. For example, in one implementation, sensor 240 is a force sensor or a load cell that detects an amount of longitudinal force. Alternatively, sensor 240 may be any other type of sensor that enables insertion tool 200 to function as described herein.

In the exemplary embodiment, biasing element 250 enables insertion tip assembly 220 to move between the resting configuration and the strained configuration. Moreover, in the exemplary embodiment, biasing element 250 facilitates counteracting, reducing and/or limiting a force applied directly to sensor 240. More specifically, in the exemplary embodiment, biasing element 250 is moveable between a home configuration and a flexed configuration and is positioned to absorb at least some of the force applied to insertion tip assembly shaft 260. For example, in one implementation, biasing element 250 moves toward the flexed position as a longitudinal force applied to insertion tip assembly 220 generally increases. Conversely, in such an implementation, biasing element 250 moves toward the home configuration as the longitudinal force applied to insertion tip assembly 220 generally decreases. Any type of biasing element 250 may be used that enables insertion tip assembly 220 to function as described herein.

In the exemplary embodiment, insertion tip assembly 220 includes a release mechanism 285 that is configured to retract insertion tip assembly 220. More specifically, in the exemplary embodiment, release mechanism 285 is configured to retract insertion tip assembly 220 such that the force applied by insertion tip assembly 220 is decreased.

In the exemplary embodiment, surface probe assembly 230 includes a sensor 290, a biasing element 300 coupled to sensor 290, and a shaft 310 coupled to biasing element 300. More specifically, in the exemplary embodiment, shaft 310 includes a proximal end 320 coupled to biasing element 300 and a distal end 330 that is couplable to grommet 140. In the exemplary embodiment, distal end 330 has a substantially planar surface 340 that enables surface probe assembly 230 to be firmly positioned adjacent grommet 140. For example, in one implementation, surface 340 has a diameter or width that is larger than a diameter or width of shaft 310. Alternatively, surface 340 may have any shape, size, and/or configuration that enables surface probe assembly 230 to function as described herein.

In the exemplary embodiment, sensor 290 enables a displacement (e.g., a movement from a resting configuration) associated with insertion tip assembly 220 to be determined. More specifically, in the exemplary embodiment, surface probe assembly 230 is movable between the resting configuration (i.e., a position wherein the longitudinal force associated with surface probe assembly 230 is zero) and a strained configuration (i.e., a position wherein the longitudinal force associated with surface probe assembly 230 is not zero), and sensor 290 detects a position associated with surface probe assembly 230. In the exemplary embodiment, the displacement associated with the insertion tip assembly 220 is determined based at least in part on the longitudinal displacement associated with surface probe assembly 230. For example, in one implementation, sensor 290 is an optical sensor that detects a position of surface probe assembly proximal end 320. In another implementation, sensor 290 is a pressure sensor that detects whether surface probe assembly proximal end 320 is coupled to sensor 290. Alternatively, sensor 290 may be any other type of sensor that enables insertion tool 200 to function as described herein.

In the exemplary embodiment, biasing element 300 enables surface probe assembly 230 to move between the resting configuration and the strained configuration. Moreover, in the exemplary embodiment, biasing element 300 facilitates counteracting, reducing and/or limiting a force applied directly to sensor 290. More specifically, in the exemplary embodiment, biasing element 300 is moveable between a home configuration and a flexed configuration and is positioned to absorb at least some of the force applied to surface probe assembly shaft 310. For example, in one implementation, biasing element 300 moves toward the flexed position as a longitudinal force applied to surface probe assembly 230 generally increases. Conversely, in such an implementation, biasing element 300 moves toward the home configuration as the longitudinal force applied to surface probe assembly 230 generally decreases. Any type of biasing element 300 may be used that enables surface probe assembly 230 to function as described herein.

In the exemplary embodiment, insertion tool 200 includes and/or is coupled to an indicator 350. In the exemplary embodiment, indicator 350 is configured to present an indication based at least in part on the force and the displacement associated with insertion tip assembly 220. More specifically, in the exemplary embodiment, indicator 350 includes and/or is coupled to a controller 360 configured to determine whether the force satisfies a first predetermined threshold and/or whether the displacement satisfies a second predetermined threshold.

In one implementation, the first predetermined threshold is between approximately 12.0 pounds and approximately 18.0 pounds. More specifically, in such an implementation, the first determined threshold is between approximately 14.0 pounds and approximately 16.0 pounds. Even more specifically, in such an implementation, the first predetermined threshold is approximately 15.0 pounds. Alternatively, the first predetermined threshold may be any other force that enables insertion tool 200 to function as described herein.

In one implementation, the second predetermined threshold is between approximately 0.285 inches and approximately 0.395 inches. More specifically, in such an implementation, the second predetermined threshold is between approximately 0.305 inches and approximately 0.375 inches. Even more specifically, in such an implementation, the second predetermined threshold is between approximately 0.315 inches and approximately 0.365 inches. Alternatively, the second predetermined threshold may be any other displacement that enables insertion tool 200 to function as described herein.

In the exemplary embodiment, controller 360 includes a processing device 370 and a memory device 380 coupled to processing device 370. In the exemplary embodiment, controller 360 is configurable to perform one or more operations described herein by programming processing device 370 and/or memory device 380. For example, processing device 370 may be programmed by encoding an operation as one or more executable instructions and by providing the executable instructions in memory device 380.

Processing device 370 may include, without limitation, a microcontroller, a microprocessor, a programmable gate array, an application specific integrated circuit (ASIC), a logic circuit, and/or any other circuit, integrated or otherwise, suitable to perform as described herein. Memory device 380 includes one or more devices operable to enable information such as executable instructions and/or other data to be stored and/or retrieved. Memory device 380 may include one or more computer readable media including, without limitation, hard disk storage, optical drive/disk storage, removable disk storage, flash memory, non-volatile memory, ROM, electrically-erasable programmable read-only memory (EEPROM), and/or random access memory (RAM). Memory device 380 is used to store one or more of executable instructions, predetermined thresholds, and/or settings specific to insertion tool 200.

In the exemplary embodiment, indicator 350 is configured to present the indication when the first predetermined threshold and/or the second predetermined threshold is satisfied. The indication may be presented in the form of visual stimuli (e.g., lights), audible stimuli (e.g., buzzing noises), and/or tactile stimuli (e.g., vibrations). For example, in one implementation, indicator 350 includes a cathode ray tube (CRT), a liquid crystal display (LCD), a light-emitting diode (LED) display, an "electronic ink" display, and/or other device suitable to display information to an operator. Additionally or alternatively, indicator 350 may include a speaker to present verbal instructions, alerts, and/or warnings to the operator.

Additionally or alternatively, indicator 350 may include motor-vibrators (e.g., electric motors with spinning weights) and/or may be fabricated at least partially from a piezoelectric material. Alternatively, indicator 350 may be fabricated from any other material that enables indicator 350 to function as described herein.

Figure 3:
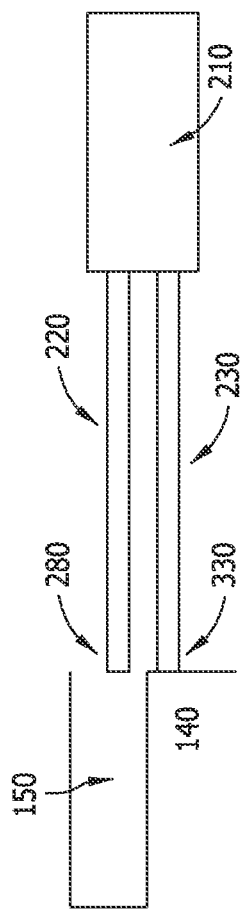
FIG. 3 is a schematic illustration of the electrical contact insertion tool shown in FIG. 2 in a first configuration.

During operation, and in the exemplary embodiment, contact 100 and wire 120 are coupled to insertion tip assembly distal end 280 for installation of electrical contact 100 into grommet 140. In the exemplary embodiment, insertion tool 200 is positioned in a first configuration (shown in FIG. 3). More specifically, in the exemplary embodiment, surface probe assembly distal end 330 is positioned substantially on and/or adjacent to grommet 140, such that insertion tip assembly distal end 280 and thus contact 100 are positioned substantially above and/or outside opening 150. For example, in one implementation, insertion tool 200 is in the first configuration when handle 210 has not yet been advanced towards opening 150. As shown in FIG. 3, both installation tip assembly 220 and surface probe assembly 230 are in a resting configuration when insertion tool 200 is in the first configuration.

Figure 4:
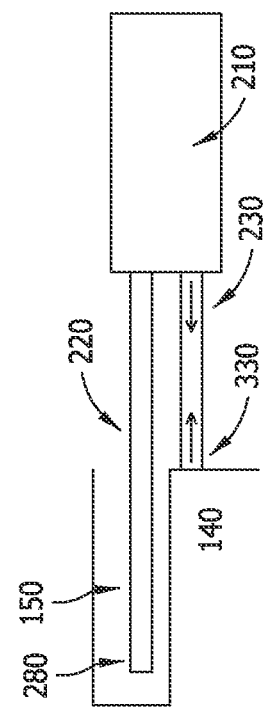
FIG. 4 is a schematic illustration of the electrical contact insertion tool shown in FIG. 2 in a second configuration.

As handle 210 is advanced towards opening 150, insertion tool 200 moves from the first configuration towards the second configuration (shown in FIG. 4). More specifically, in the exemplary embodiment, surface probe assembly distal end 330 is positioned substantially on and/or adjacent to grommet 140 while insertion tip assembly distal end 280, and therefore contact 100, are advanced at least partially within and/or through opening 150. For example, in one implementation, insertion tool 200 is in the second configuration when handle 210 is advanced towards opening 150 a distance that is less than or substantially equal to a predetermined distance (e.g., depth 160 of opening 150). As shown in FIG. 4, installation tip assembly 220 is in a resting configuration and surface probe assembly 230 is in a strained configuration when insertion tool 200 is in the second configuration. That is, when insertion tool 200 is in the second configuration, surface probe assembly 230 is compressed between handle 210 and grommet 140.

Figure 5:
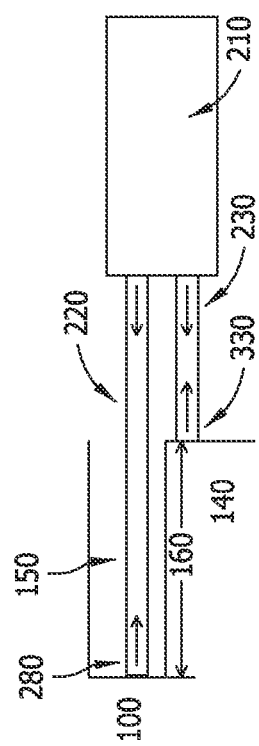
FIG. 5 is a schematic illustration of the electrical contact insertion tool shown in FIG. 2 in a third configuration.

As handle 210 is advanced further towards opening 150, at some point, insertion tool 200 moves from the second configuration towards the third configuration (shown in FIG. 5). More specifically, in the exemplary embodiment, surface probe assembly distal end 330 is positioned substantially on and/or adjacent to grommet 140 and insertion tip assembly distal end 280 is positioned substantially on and/or adjacent to electrical contact 100. For example, in one implementation, insertion tool 200 is in the second configuration when handle 210 is advanced towards opening 150 a distance that is greater than a predetermined distance (e.g., depth 160 of opening 150). As shown in FIG. 5, installation tip assembly 220 and surface probe assembly 230 are both in a strained configuration when insertion tool 200 is in the third configuration. That is, when insertion tool 200 is in the third configuration, insertion tool 220 is compressed between handle 210 and electrical contact 100, and surface probe assembly 230 is compressed between handle 210 and grommet 140.

During operation, in the exemplary embodiment, sensor 240 detects a longitudinal force associated with insertion tip assembly 220, and sensor 290 detects a position associated with surface probe assembly 230. In the exemplary embodiment, controller 360 determines a force associated with insertion tip assembly 220 based on the detected longitudinal force, and a displacement associated with insertion tip assembly 220 is ascertained based on the operation of surface probe assembly 230 and sensor 290. For example, in one implementation, the force associated with insertion tip assembly 220 may be equal to the longitudinal force detected by sensor 240, and the displacement associated with insertion tip assembly 220 may be determined based at least in part on the longitudinal force detected by sensor 240, biasing element 250, Hooke's law, and/or the amount of travel (e.g., displacement) detected by sensor 290.

In the exemplary embodiment, controller 360 determines whether the force associated with insertion tip assembly 220 satisfies a first predetermined threshold and/or whether the displacement associated with insertion tip assembly 220 satisfies a second predetermined threshold. More specifically, in the exemplary embodiment, controller 360 utilizes the threshold determinations to determine that electrical contact 100 is properly installed and/or fully seated within grommet 140 and transmits a signal to indicator 350 that enables an indication to be presented when the determined displacement satisfies the first predetermined threshold and the determined force satisfies the second predetermined threshold.

In the exemplary embodiment, release mechanism 285 automatically retracts insertion tip assembly 220 when the first and second predetermined thresholds are satisfied such that insertion tip assembly shaft 260 is at least partially withdrawn from opening 150. In the exemplary embodiment, release mechanism 285 is actuated to at least partially withdraw insertion tip assembly shaft 260 such that the force applied by insertion tip assembly 220 and/or the displacement of insertion tip assembly 220 is decreased.

The present disclosure relates generally to hand tools and, more particularly, to a self-monitoring electrical contact insertion tool. Electrical contacts are likely to be fully seated when a certain amount of force is applied and/or an insertion tip is advanced a certain distance. The embodiments described herein enable a user to quickly and repeatedly apply a predetermined amount of force and/or advance the insertion tip a predetermined distance. Moreover, the embodiments described herein quickly provide feedback associated with the force and distance to facilitate determining whether an electrical contact is fully seated.

Exemplary embodiments of a self-monitoring electrical contact insertion tool are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical contact insertion tool comprising:
    a handle;
    an insertion tip assembly extending from the handle, the insertion tip assembly configured to apply a force to an electrical contact to accomplish insertion of the electrical contact into an electrical connector;
    a surface probe assembly extending from the handle, the surface probe assembly configured to determine a displacement associated with the insertion tip assembly;
    an indicator configured to present an indication of positive electrical contact insertion based at least in part on the force and the displacement associated with the insertion tip assembly; and
    a release mechanism configured to decrease at least one of the force associated with the insertion tip assembly and the displacement associated with the insertion tip assembly.

2. An electrical contact insertion tool in accordance with claim 1, wherein the insertion tip assembly is movable between a resting configuration and a strained configuration, and the surface probe assembly is movable between a resting configuration and a strained configuration.

3. An electrical contact insertion tool in accordance with claim 1, wherein the insertion tip assembly comprises a sensor configured to detect a longitudinal force associated with the insertion tip assembly.

4. An electrical contact insertion tool in accordance with claim 1, wherein the surface probe assembly comprises a sensor configured to detect a displacement associated with the surface probe assembly.

5. An electrical contact insertion tool in accordance with claim 1 further comprising a controller configured to determine whether the force applied with the insertion tip assembly satisfies a predetermined threshold, wherein the indicator is further configured to present the indication when the predetermined threshold associated with the insertion tip assembly is satisfied.

6. An electrical contact insertion tool in accordance with claim 1 further comprising a controller configured to determine whether the displacement of the insertion tip assembly satisfies a predetermined threshold, wherein the indicator is further configured to present the indication when the predetermined threshold associated with the insertion tip assembly is satisfied.

7. An electrical contact insertion tool comprising:
    a handle;
    an insertion tip assembly extending from the handle, said insertion tip assembly configured to apply a force to an electrical contact to accomplish insertion of the electrical contact into an electrical connector;
    a surface probe assembly extending from the handle; and
    an indicator configured to present an indication of positive electrical contact insertion based at least in part on the force associated with the insertion tip assembly and a displacement associated with the insertion tip assembly.

8. An electrical contact insertion tool in accordance with claim 7, wherein the insertion tip assembly is movable between a resting configuration and a strained configuration, and wherein the insertion tip assembly comprises a sensor that enables the force associated with the insertion tip assembly to be determined.

9. An electrical contact insertion tool in accordance with claim 7 further comprising a controller that is configured to determine whether the force applied with the insertion tip assembly satisfies a predetermined threshold, wherein the indicator is further configured to present the indication when the predetermined threshold associated with the insertion tip assembly is satisfied.

10. An electrical contact insertion tool in accordance with claim 7 further comprising a controller that is configured to determine whether the displacement of the insertion tip assembly satisfies a predetermined threshold, wherein the indicator is further configured to present the indication when the predetermined threshold associated with the insertion tip assembly is satisfied.

11. An electrical contact insertion tool in accordance with claim 7 wherein the surface probe assembly is movable between a resting configuration and a strained configuration, and wherein the surface probe assembly comprises a sensor that enables the displacement associated with the insertion tip assembly to be determined.

12. An electrical contact insertion tool in accordance with claim 7 further comprising a release mechanism configured to decrease at least one of the force associated with the insertion tip assembly and the displacement associated with the insertion tip assembly.

\* \* \* \* \*